US008565520B2

(12) United States Patent
Williams et al.

(10) Patent No.: US 8,565,520 B2
(45) Date of Patent: Oct. 22, 2013

(54) DETERMINING FOREGROUND REGIONS AND BACKGROUND REGIONS IN AN IMAGE

(75) Inventors: Oliver M. C. Williams, San Francisco, CA (US); Michael Isard, San Francisco, CA (US); Paul R. Barham, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 13/157,337

(22) Filed: Jun. 10, 2011

(65) Prior Publication Data

US 2012/0314942 A1    Dec. 13, 2012

(51) Int. Cl.
  *G06K 9/34*    (2006.01)
(52) U.S. Cl.
  USPC .......................................... 382/164
(58) Field of Classification Search
  USPC .................. 382/103, 154, 164, 180
  See application file for complete search history.

(56) References Cited

U.S. PATENT DOCUMENTS

| 6,674,877 | B1 | 1/2004 | Jojic et al. |
| 7,676,081 | B2 | 3/2010 | Blake et al. |
| 7,702,131 | B2 | 4/2010 | Chinen et al. |
| 7,751,589 | B2 | 7/2010 | Bovyrin et al. |

OTHER PUBLICATIONS

Schindler, et al., "Smooth Foreground-Background Segmentation for Video Processing", Retrieved at << https://www1.ethz.ch/igp/photogrammetry/publications/pdf_folder/schindler06accv.pdf >>, 2006, p. 581-590.

Wang, et al., "A Consensus Based Method for Tracking: Modelling Background Scenario and Foreground Appearance", Retrieved at << http://citeseerx.ist.psu.edu/viewdoc/download?doi=10.1.1.117.2543&rep=rep1&type=pdf >>, Pattern Recognition, vol. 40, No. 3, Mar. 2007, p. 1-36.

Lu, et al., "Foreground and Shadow Occlusion Handling for Outdoor Augmented Reality", Retrieved at << http://www.cvl.iis.u-tokyo.ac.jp/~oishi/Papers/Vinh_Occlusion_ISMAR2010.pdf >>, Oct. 2010, pp. 10.

Zhang, et al., "Robust Bilayer Segmentation and Motion/Depth Estimation with a Handheld Camera", Retrieved at << http://www.cse.cuhk.edu.hk/~leojia/papers/video_bilayer_pami2011.pdf >>, IEEE Transactions on Pattern Analysis and Machine Intelligence, vol. 33, No. 3, Mar. 2011, p. 603-617.

Qin, et al., "Scene Segmentation Based on Seeded Region Growing for Foreground Detection", Retrieved at << http://ieeexplore.ieee.org/stamp/stamp.jsp?tp=&arnumber=5584032 >>, Sixth International Conference on Natural Computation, 2010, p. 3619-3623.

(Continued)

*Primary Examiner* — Duy M Dang
(74) *Attorney, Agent, or Firm* — Microsoft Corporation (57) ABSTRACT

A system for providing augmented reality detects foreground occluders in an image of a video stream. One or more virtual objects are then rendered appropriately with respect to the occluders. Location information associated with the image is used to retrieve a three dimensional representation of the location where the image was taken. Features that are expected to appear in the image based on the three dimensional location but that cannot be located are used to determine regions of the image that are likely to include foreground occluders. Pixels in these regions are used to train a color model that classifies pixels as either part of the background of the image or part of one or more foreground occluders. The pixels in the image are classified using the model, and one or more virtual objects are rendered so that they appear behind any foreground occluders.

20 Claims, 6 Drawing Sheets

(56) References Cited

OTHER PUBLICATIONS

Klein, et al., "Parallel Tracking and Mapping for Small AR Workspaces", Retrieved at << http://www.robots.ox.ac.uk/~lav/Papers/klein_murray_ismar2007/klein_murray_ismar2007.pdf >>, Proceedings of the 6th IEEE and ACM International Symposium on Mixed and Augmented Reality, 2007, pp. 10.

Calonder, et al., "BRIEF: Binary Robust Independent Elementary", Retrieved at << http://cvlab.epfl.ch/~calonder/CalonderLSF10.pdf >>, Proceedings of the 11th European conference on Computer vision: Part IV, 2010, p. 1-14.

Lowe, David, "Demo Software: SIFT Keypoint Detector", Retrieved at << http://www.cs.ubc.ca/~lowe/keypoints/ >>, Retrieved Date : Mar. 25, 2011, pp. 2.

Hartley, et al., "Multiple View Geometry in Computer Vision Second Edition", Retrieved at << http://www.robots.ox.ac.uk/~vgg/hzbook/index.html >>, Mar. 2004, p. 1.

Kolmogorov, et al., "Bi-layer segmentation of binocular stereo video", Retrieved at << http://research.microsoft.com/apps/pubs/default.aspx?id=67281 >>, Proceedings of the IEEE Computer Society Conference on Computer Vision and Pattern Recognition, vol. 2, 2005, p. 1-8.

DETERMINING FOREGROUND REGIONS AND BACKGROUND REGIONS IN AN IMAGE

BACKGROUND

Augmented reality is when virtual objects are rendered into an image or video of a real scene, "augmenting" it with additional information such as travel directions, game characters, advertising, etc. Typically, a user views the scene, either through a head-mounted display, or through a rendered video stream captured by a camera (e.g., on a phone), and the virtual objects are placed into the scene. Techniques such as computer vision are used to estimate the position and orientation of the viewer with respect to the scene, so that virtual objects are rendered appropriately.

For example, a user may use a camera on their phone to view a video stream of a street scene that is in front of the user. The street scene may be augmented to identify one or more landmarks in the scene or to include reviews or comments on restaurants or other items of interest in the video stream. These comments or reviews may be rendered in the video stream as virtual objects using one or more icons and may appear to be part of the street scene.

One problem with such an approach is how to deal with occlusions caused by the user "interacting" with one or more of the virtual objects. For example, if the user puts their hand or other occluder in front of the camera, one or more virtual objects that are behind the user's hand should no longer be visible. While real objects in the street scene will be naturally obscured from view by the occluder, the same is not true for the virtual objects. Consequently, the illusion that the virtual objects are a part of the scene will be broken, leading to an unsatisfactory user experience.

SUMMARY

A system for providing augmented reality detects foreground occluders in an image of a video stream. One or more virtual objects are then rendered appropriately with respect to the occluders. Location information associated with the image is used to retrieve a three dimensional representation of the location where the image was taken. Features that are expected to appear in the image based on the three dimensional location but that cannot be located are used to determine regions of the image that are likely to include foreground occluders. Pixels in these regions are used to train a color model that classifies pixels as either part of the background of the image or part of one or more foreground occluders. The pixels in the image are classified using the model, and one or more virtual objects are rendered so that they appear behind any foreground occluders.

In an implementation, an image is received at a computing device. The image is associated with location information and the image includes pixels. Expected features are determined using the location information at the computing device. The pixels of the image are partitioned into one or more foreground regions and background regions based on the expected features. One or more virtual objects are rendered in the digital image based on the one or more foreground and background regions at the computing device.

In an implementation, an image is generated at a computing device. The image is associated with location information and the image includes pixels. The location information is provided by the computing device. Expected features are received based on the location information at the computing device. One or more of the expected features that are not found in the generated image are determined. The pixels are partitioned into one or more foreground regions and background regions based on the determined one or more features. One or more virtual objects are rendered in the digital image based on the one or more foreground and background regions.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
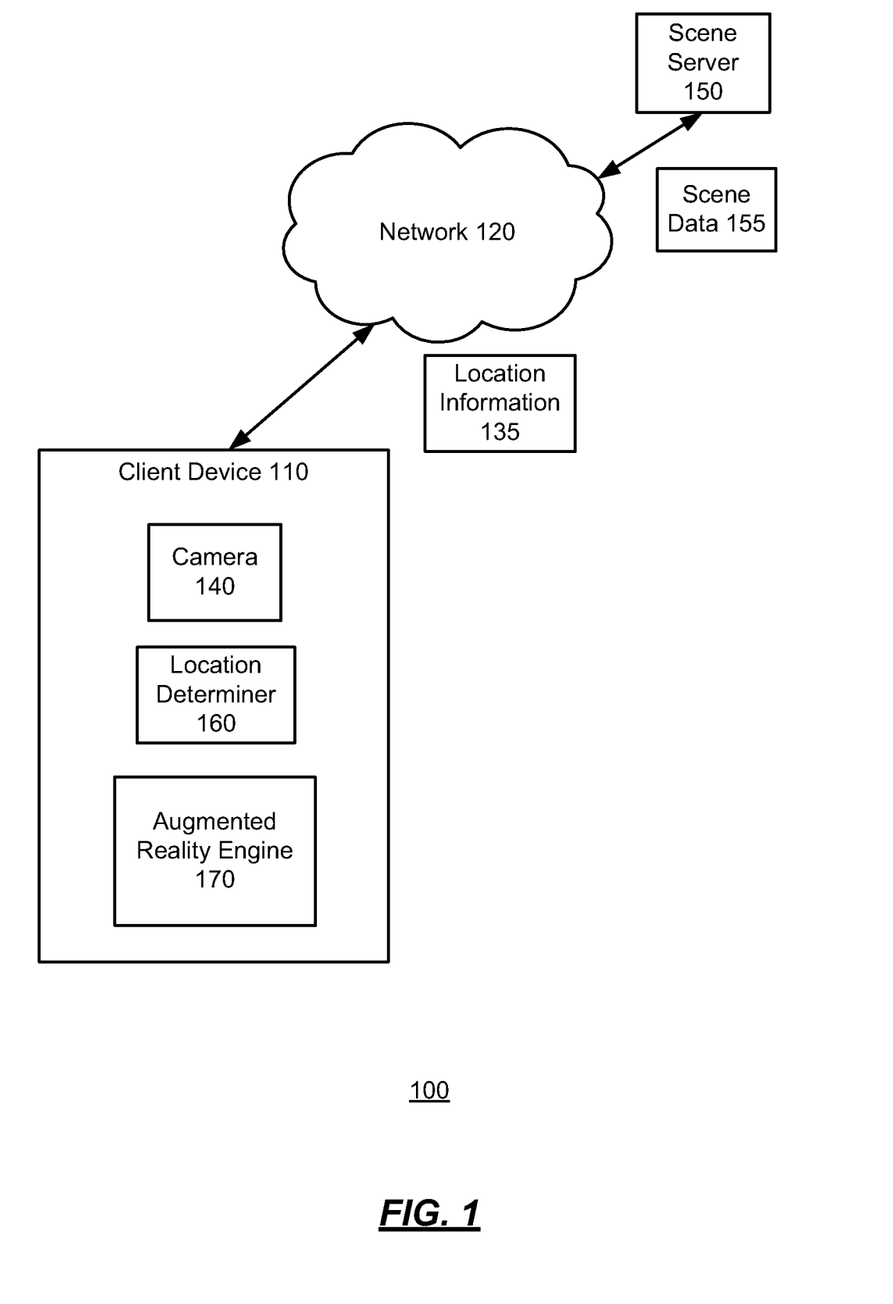
FIG. 1 is an illustration of an example environment for detecting and/or rendering foreground occluders in an augmented reality system.

FIG. 1 is an illustration of an example environment 100 for detecting and/or rendering foreground occluders in an augmented reality system. The environment 100 may include a client device 110 and a scene server 150 in communication with one another through a network 120. The network 120 may be a variety of network types including the public switched telephone network (PSTN), a cellular telephone network, and a packet switched network (e.g., the Internet).

In some implementations, the client device 110 may include a desktop personal computer, workstation, laptop, PDA (personal digital assistant), mobile phone, smart phone, videogame console, head-mounted display, or any WAP (wireless application protocol) enabled device or any other computing device. A client device 110 may be implemented using a general purpose computing device such as the computing device 600 described with respect to FIG. 6, for example. While only one client device 110 is shown, it is for illustrative purposes only; multiple client devices may be supported.

The client device 110 may interface with, or may include, a camera 140. The camera 140 may be a digital camera and may take and generate images such as digital images. Each image may include a plurality of pixels. The camera 140 may generate sequences of digital images that may be used by the client device 110 to form a digital video stream. In some implementations, the camera 140 may also record audio data along with the digital images. The camera 140 may be implemented using a variety of well known digital imaging technologies. For example, the camera 140 may be implemented using the digital camera functionality commonly found in many mobile phones and smart phones.

The client device 110 may further include a location determiner 160. When the client device 110 receives a digital image from the camera 140, the client device 110 may use the location determiner 160 to determine location information 135 associated with the digital image. The location information 135 may comprise coordinates that identify a location where the image was taken. Any one of a variety of systems or techniques for determining a location may be used. For example, the location determiner 160 may comprise a global positioning system (GPS) device or may be a system that determines location based on proximity to cellular towers or wifi hotspots.

In some implementations, the location information 135 may include orientation information and/or depth information. The orientation information may include information that describes the orientation of the camera 140 and/or the client device 110 when the digital image was taken or generated. For example, the orientation may include an angle of the camera 140, or a direction that the camera 140 was facing (e.g., north, south, etc.) when the image was taken. The location determiner 160 may determine the orientation information using a variety of well known methods and/or techniques.

The depth information may include a distance from the camera 140 and/or client device 110 from a subject or focal point of the digital image. For example, if the digital image is of a store front, the depth information may indicate how far from the store front the camera 140 was when the digital image was taken. The location determiner 160 may determine the depth information using a variety of well known methods and/or techniques.

The client device 110 may provide the location information 135 to a scene server 150 through the network 120. In some implementations, the client device 110 may first receive consent from a user associated with the client device 110 before providing the location information 135 to the scene server 150. In addition, the identity of the user associated with the client device 110 may not be determinable from the location information 135.

The scene server 150 may use the location information 135 to determine scene data 155 for the digital image. The scene data 155 may include a plurality of features that are expected to appear in the digital image based on the location information 135. In some implementations, the scene data 155 may comprise a three dimensional representation of the location associated with the image and the expected features. Each feature may be a point or group of points that make up a landmark, a building, a visible object, or a point of interest associated with the location. The scene data 155 for each location may have been previously generated by a user or administrator, for example.

The scene server 150 may provide the scene data 155 to the client device 110. In some implementations, rather than provide the location information 135 to the scene server 150, the client device 110 may determine the scene data 155 from the location information 135. Thus, some or all of the functionality provided by the scene server 150 may be provided by the client device 110. In such implementations, each client device 110 may include a database of the scene data 155 associated with a plurality of locations. The database may include scene data 155 associated with all known locations, or may only include scene data 155 for locations that the client device 110 is likely to travel to, for example.

The client device 110 may further include an augmented reality engine 170. The augmented reality engine 170 may use the scene data 155 and one or more digital images to provide an augmented reality experience to a user associated with the client device 110. In some implementations, the augmented reality engine 170 may generate a video stream from one or more of the digital images and the scene data 155. The video stream may then be displayed to the user of the client device 110 on a display or other output means associated with the client device 110. In addition, one or more virtual objects may be rendered into the video stream by the augmented reality engine 170. The virtual objects may include graphical overlays on one or more objects or places shown in a digital image of the video stream. For example, in a video game application, the augmented reality engine 170 may place virtual objects corresponding to game characters into the video stream.

Figure 2:
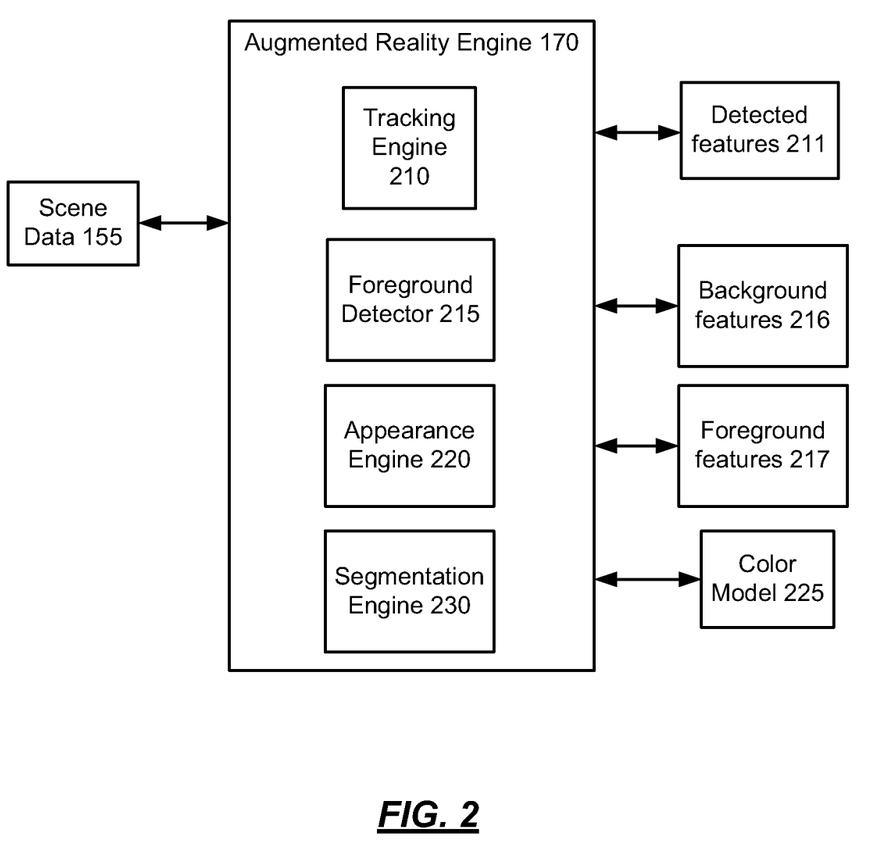
FIG. 2 is an illustration of an example augmented reality engine.

As described further with respect to FIG. 2, the augmented reality engine 170 may determine one or more foreground occluders in a digital image of the video stream, and may render the virtual objects in the digital image to account for the foreground occluders. For example, if the foreground occluder and a virtual object share a common pixel location in the digital image, the virtual object may be rendered to be partially obscured by the foreground occluder. In some implementations, the foreground occluders may be determined by determining expected features from the scene data 155 that are not visible, or are missing in the digital image. The augmented reality engine 170 may then generate a color model based on these missing features that identifies pixels in the digital image that are likely to be associated with a foreground occluder and pixels that are likely to be associated with the background of the digital image. This color model may then be used to determine pixels in the digital image that belong to one or more foreground occluders.

FIG. 2 is an illustration of an example augmented reality engine 170. The augmented reality engine 170 includes one or more components including, but not limited to, a tracking engine 210, a foreground detector 215, an appearance engine 220, and a segmentation engine 230. More or fewer components may be supported. The augmented reality engine 170 may be implemented using a general purpose computing device such as the computing device 600 illustrated in FIG. 6, for example.

The tracking engine 210 may use the expected features from the scene data 155, and may determine the locations of some or all of the expected features in a digital image. The expected features that are located in the digital image may be stored at the detected features 211. In some implementations, the tracking engine 210 may perform a search for each of the expected features in the digital image approximately where each expected feature is predicted to be in the digital image according to the scene data 155. Any one of a variety of known methods for locating features in an image based on expected features may be used.

The tracking engine 210 may use the detected features 211 to divide the expected features into a set of background features 216 and a set of foreground features 217. The background features 216 may initially be the same features as the detected features 211. The foreground features 217 may be the expected features of the scene data 155 that were not determined by the tracking engine 210. Because the features in the background features 216 were found in the digital image, they cannot be obscured by an occluder. Similarly, because the features in the foreground features 217 were not found in the digital image, they may be evidence of a possible occluder in the digital image.

The foreground detector 215 may refine the features in the foreground features 217. As described above, the features in the foreground features 217 were features from the expected features of the scene data 155 that were not located in the digital image. While some of the features in the foreground features 217 may represent areas of the digital image that are obscured by an occluder, many of the features in the foreground features 217 may not have been located due to errors in the scene data 155, lighting issues associated with the digital image caused by time or weather, for example, or inaccurate location information 135. Thus, the foreground detector 215 may refine the foreground features 217 to remove features that were likely to have been missed because of one or more errors rather than a foreground occluder.

In some implementations, the foreground detector 215 may include a color mismatch stage and a connected components stage. In the color mismatch stage, the foreground detector 215 may test a region of pixels around each feature of the foreground features 217 and compare the colors in the pixel region with colors associated with one or more of the features in the background features 216. In some implementations, the pixel region may be a 3×3 pixel region, although other sized regions may be used. If the colors of the pixel region for a feature of the foreground features 217 are close to the colors associated with one or more of the background features, then the feature may be removed from the foreground features 217 by the foreground detector 215. In addition, the feature may be added to the background features 216.

In the connected components stage, the foreground detector 215 may determine one or more connected components in the digital image using the foreground features 217. For some of the features in the foreground features 217, the reason that the feature was not found in the image may be different for each feature. For example, one feature may be in the foreground features 217 because of noise in the digital image, and another feature may be in the foreground features 217 because of faulty scene data 155. Such mismatched features are likely to be uniformly distributed throughout the digital image. In contrast, features in the foreground features 217 that are not matched because of a foreground occluder are likely to be clustered together.

Accordingly, the foreground detector 215 may determine connected components from the features of the foreground features 217, and may remove features from the foreground features 217 that are not part of a connected component, or that are part of a connected component that is less than a threshold size. In some implementations, the foreground detector 215 may determine connected components by constructing a graph from the features in the foreground features 217. The graph may include a vertex for each feature from the foreground features 217. The foreground detector 215 may then consider each pair of features f and f' from the foreground features 217, and may generate an edge between the vertices representing the features f and f' if the distance between the features f and f' is less than the distance between f and any feature from the background features 216.

The resulting graph may include zero or more connected components that represent possible foreground occluders. In some implementations, the foreground detector 215 may then select the features from the foreground features 217 that are associated with vertices from connected components that are greater than a threshold size. For example, the foreground detector 215 may select features associated with connected components that have more than 80 vertices. Other threshold values may be used. The selected features may remain in the foreground features 217, and the non-selected features may be removed from the foreground features 217 and may be added to the background features 216.

The augmented reality engine 170 may further include an appearance engine 220. The appearance engine 220 may generate a color model 225 based on the background features 216 and the foreground features 217 that may be used to partition the digital image into one or more background regions and one or more foreground regions. The one of more foreground regions may represent one or more foreground occluders in the digital image.

In some implementations, the color model 225 may be generated by appearance engine 220 using a training set of pixels based on the features in the background features 216 and the foreground features 217. The color model 225 may comprise or use a Gaussian mixture model and may be trained using an expectation-maximization algorithm. However, other types of models and/or training techniques may be used.

Initially, the pixels in the training set for each model may include a region of pixels surrounding each feature in the foreground features 217 and the background features 216. The colors associated with the pixel regions surrounding the background features 216 may be sampled and used as the training set to train the color model 225 to identify pixels that are likely to be part of one or more background regions. The colors associated with the pixel regions surrounding the foreground features 217 may similarly be used as the training set to train the color model 225 to identify pixels that are likely to be part of one of more foreground regions. In some implementations, the pixel regions may be 3×3 pixel regions. Other size pixel regions may also be used to train the color model 225.

The segmentation engine 230 may use the color model 225 generated by the appearance engine 220 to assign to each pixel in the digital image a probability that the pixel is part of either one or more foreground regions of the digital image, or one or more background regions of the digital image. The segmentation engine 230 may assign the probability to each pixel using the color model 225 and colors associated with the pixel in the digital image. In some implementations, pixels having a probability of belonging to one or more foreground regions that is greater than a threshold probability may be partitioned together to form one or more foreground regions. All other pixels may be partitioned together to form one or more background regions. The one or more foreground and background regions may then be used by the augmented reality engine 170 to render one or more virtual objects.

In some implementations, the segmentation engine 230 may discard detected foreground regions that are less than a threshold size. For example, the segmentation engine 230 may discard detected foreground regions that have less than 100 pixels. Discarded detected foreground regions may be added to the one or more background regions.

In some implementations, the segmentation engine 230 may provide the probabilities assigned to each pixel to the appearance engine 220 to use to further refine the color model 225. The pixels may be added to the training sets for the color model 225 along with a weight representing their assigned probability. For example, if the segmentation engine 230 assigns a probability of 0.7 that a pixel is part of one or more foreground regions of the digital image, then the appearance engine 220 may add the pixel to the training set for the foreground region with a weight of 0.7. In addition, the appearance engine 220 may add the pixel to the training set for the background region with a weight of 0.3. The appearance engine 220 may then train the color model 225 using the updated training sets. The updated color model 225 may then be used to partition pixels in a subsequently received digital image.

In some implementations, the segmentation engine 230 may apply the color model 225 to each pixel in the digital image starting at a top left most pixel of the digital image and continuing right for each horizontal scan line of the digital image. To increase the spatial smoothness of each foreground region, the segmentation engine 230 may consider the probabilities generated for neighboring or previous pixels when applying the color model 225 to a pixel. Thus, when the probability generated by the segmentation engine 230 using the color model 225 for a pixel is ambiguous, the probabilities associated with its neighboring pixels may be considered. For example, if the segmentation engine 230 determines that the probability that a pixel belongs to one or more foreground regions is 0.5, and the probabilities of one or more neighboring pixels belonging to a foreground region was 0.9, then the segmentation engine 230 may increase the probability of the pixel because it is likely that the pixel also belongs to the foreground region.

In some implementations, the appearance engine 220 may operate in two states, an unlocked state and a locked state. The unlocked state may be the initial or default state of the appearance engine 220 and may indicate that no foreground regions have yet been determined in a digital image by the segmentation engine 230, or that a previously detected foreground region is no longer visible. The locked mode of the appearance engine 220 may indicate that one or more foreground regions have been detected by the segmentation engine 230. The segmentation engine 230 may place the appearance engine 220 in the locked mode when it determines one or more foreground regions in a digital image. The segmentation engine 230 may place the appearance engine 220 in the unlocked mode when no foreground regions are detected.

The state of the appearance engine 220 may determine how the appearance engine 220 updates the color model 225. When the appearance engine 220 is in the unlocked state and a foreground occluder is detected, the appearance engine 220 may use an expectation-maximization algorithm that rapidly adapts based on the pixels in a current digital image. When the appearance engine 220 is in the locked state, the appearance engine 220 may use an expectation-maximization algorithm that adapts more slowly and considers the pixels from previous digital images. For example, the appearance engine 220 may weight the training data based on the output of the segmentation engine 230 as described above.

As an extension to the segmentation engine 230, in some implementations, the probability assigned to each pixel may be further extended to support motion blur. For example, where a foreground occluder is moving rapidly from one side of the digital image to the other, there may be motion blur, and therefore a single pixel may simultaneously belong to both the background region of the digital image and the foreground region of the digital image. To account for such duality of pixels, the segmentation engine 230 may assign each pixel a fractional assignment to one or more of the background or foreground regions. For example, the segmentations engine may assign each pixel an alpha value from the set {0, 0.2, 0.4, 0.6, 0.8, 1}, where the alpha value assigned to a pixel represents the fractional assignment of the pixel to one or more of the foreground regions.

As a further extension to the segmentation engine 230, in some implementations, the segmentation engine 230 may determine one or more foreground regions in a digital image using the color model 225 as well as pixel classification information determined for a previous digital image. In the example described above, the segmentation engine 230 provides coherence in the one or more foreground regions determined for each digital image by updating the color model 225 based on the pixel classifications of the segmentation engine 230. The coherence between digital images may further be increased by having the segmentation engine 230 classify the pixels in a digital image based on the color model 225 along with the classification generated for each pixel in a previous digital image. For example, the segmentation engine 230 may consider the pixel locations for each of the one or more foreground regions in a previous image when determining the pixel locations of the one or more foreground regions in a current image.

Figure 3:
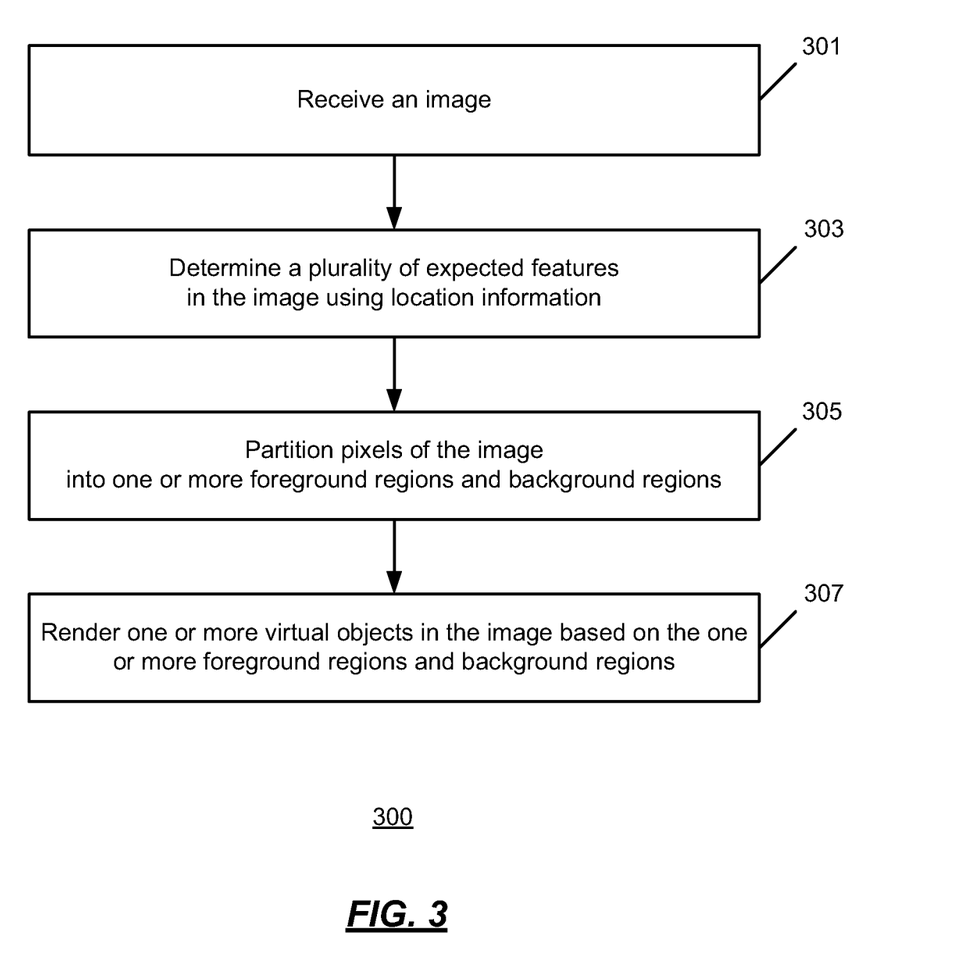
FIG. 3 is an illustration of an operational flow of an implementation of a method for rendering one or more virtual objects in the presence of one or more occluders.

FIG. 3 is an illustration of an operational flow of an implementation of a method 300 for rendering one or more virtual objects in the presence of one or more occluders. The method 300 may be implemented by the augmented reality engine 170, for example.

An image is received at 301. The image may be a digital image and may be received by the augmented reality engine 170 from a camera 140. The augmented reality engine 170 and the camera 140 may be part of a client device 110 such as a mobile phone or smart phone, for example. The image may be a digital image and may include a plurality of pixels and may be associated with location information such as GPS coordinates and orientation information. The image may be part of an image stream or may be a frame of a digital video, for example.

A plurality of expected features in the image is determined using the location information at 303. The plurality of expected features may be determined by the tracking engine 210 of the augmented reality engine 170. The plurality of expected features may be or comprise the scene data 155 and may be features associated with a three dimensional model that may have been previously generated based on the location identified by the location information, for example.

The pixels of the image are partitioned into one or more foreground regions and background regions at 305. The pixels may be partitioned by the appearance engine 220 and the segmentation engine 230 of the augmented reality engine 170. In some implementations, features from the expected features that are visible and not visible in the image are determined. The features that are visible may be used by the appearance engine 220 to select pixels to train a color model 225 to identify pixels that are likely to be part of a background region. Similarly, features that are not visible are used by the appearance engine 220 to select pixels to train the color model 225 to identify pixels that are likely to be part of a foreground region (i.e., an occluder). Because the features are not visible in the image, they may be blocked by a foreground occluder. Therefore, pixels that are proximate to the location of the missing expected features in the image may be part of the foreground occluder and may be used to train the color model 225.

One or more virtual objects are rendered in the image based on the one or more foreground regions and background regions at 307. The virtual objects are rendered by the augmented reality engine 170. In some implementations, the augmented reality engine 170 may render the virtual objects so that they are obscured by, and appear behind, the foreground regions of the image, and appear in front of the background region of the image. In other implementations, one or more of the foreground regions may be rendered using a virtual object. For example, where the foreground region represents a hand of a user of the client device 110, the hand may be rendered with a graphical element to render a hand of a character in a videogame that the user is playing.

Figure 4:
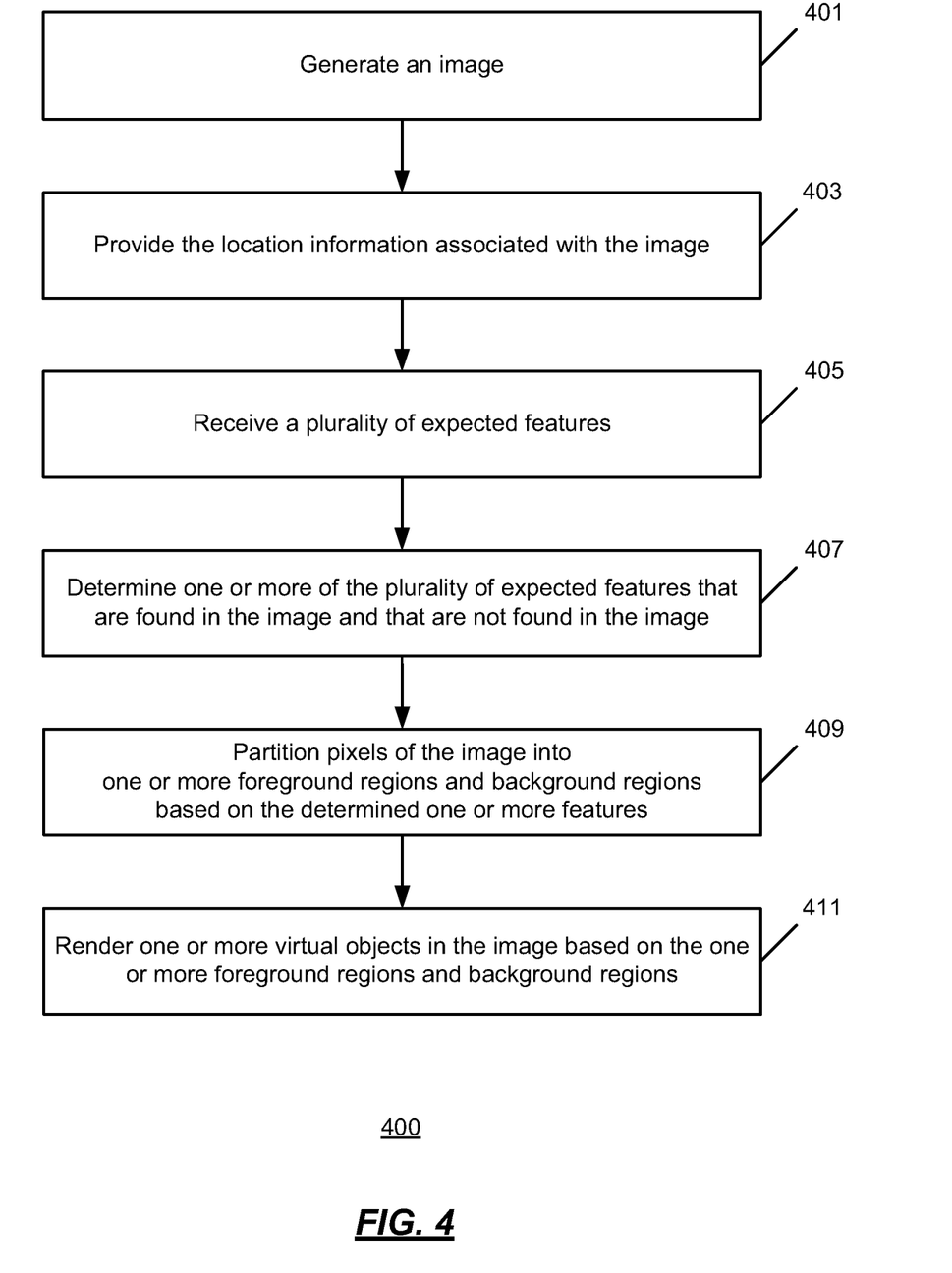
FIG. 4 is an illustration of an operational flow of another implementation of a method for rendering one or more virtual objects in the presence of one or more occluders.

FIG. 4 is an illustration of an operational flow of an implementation of a method 400 for rendering one or more virtual objects in the presence of one or more occluders. The method 400 may be implemented by the augmented reality engine 170, for example.

An image is generated at 401. The image may be a digital image and may be generated by a camera 140 of a client device 110. The image may be a digital image and may include a plurality of pixels and may be associated with location information such as GPS coordinates and orientation information.

The location information associated with the image is provided at 403. The location information may be provided by the augmented reality engine 170 to a scene server 150 through a network 120. The network 120 may be a variety of network types such as a cellular network.

A plurality of expected features is received at 405. The plurality of expected features may be or comprise the scene data 155 and may be features associated with a three dimensional model that may have been previously generated based on the location identified by the location information, for example.

One or more of the plurality of expected features that are found in the image and that are not found in the image are determined using the location information at 407. The one or more of the plurality of expected features may be determined by the tracking engine 210 of the augmented reality engine 170.

The pixels of the image are partitioned into one or more foreground regions and one or more background regions based on the determined feature(s) at 409. The pixels may be partitioned by the appearance engine 220 and the segmentation engine 230 of the augmented reality engine 170.

One or more virtual objects are rendered in the image based on the one or more foreground regions and background regions at 411. The virtual objects are rendered by the augmented reality engine 170. In some implementations, the augmented reality engine 170 may render the virtual objects so that they are obscured by, and appear behind, the foreground regions of the image, and appear in front of the background region of the image.

Figure 5:
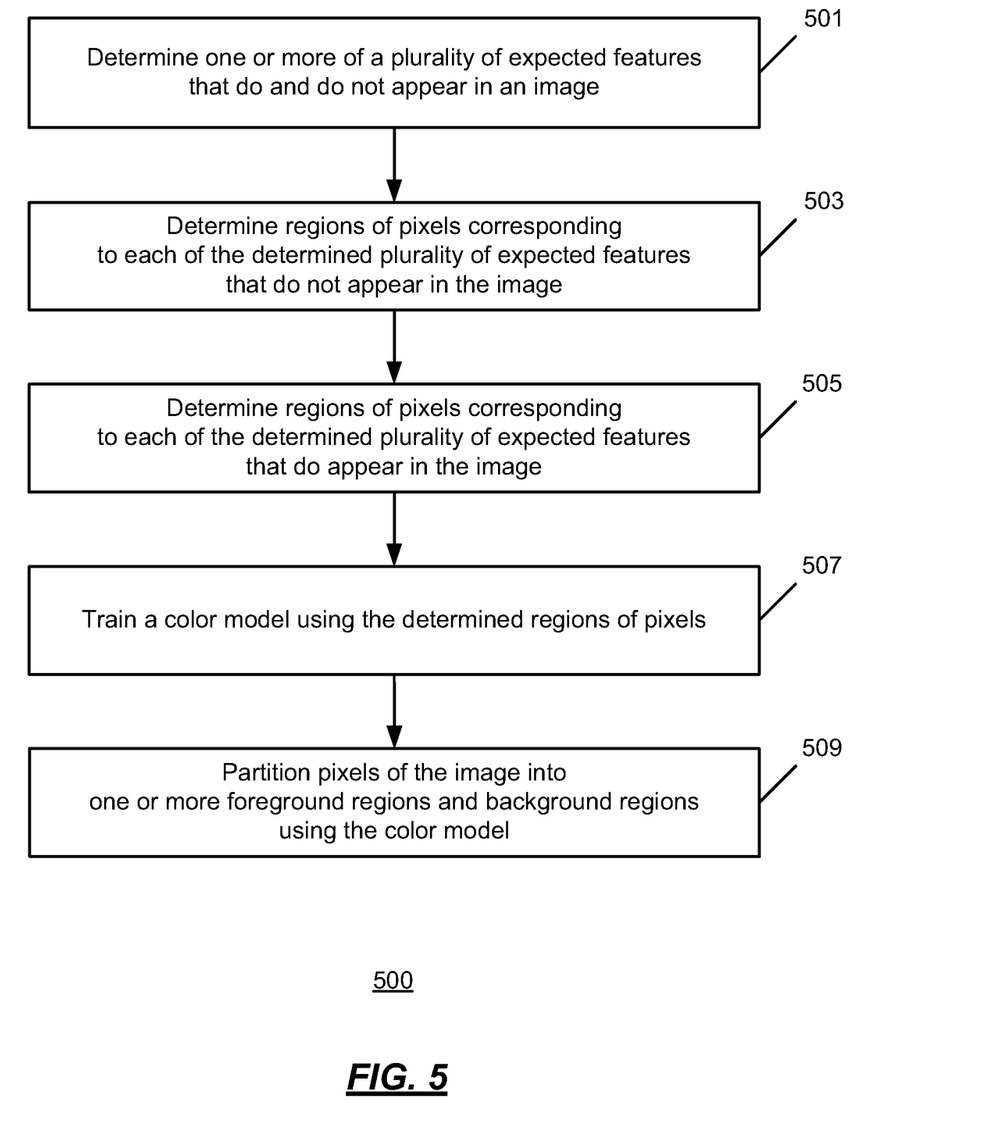
FIG. 5 is an illustration of an operational flow of an implementation of a method for partitioning pixels of a digital image into one or more background regions and foreground regions.

FIG. 5 is an illustration of an operational flow of an implementation of a method 500 for partitioning pixels of a digital image into one or more background regions and foreground regions. The method 500 may be implemented by the augmented reality engine 170, for example.

A plurality of expected features that appear in an image and a plurality of expected features that do not appear in the image are determined at 501. The expected features may be part of the scene data 155 and may have been determined based on location information associated with the image.

Regions of pixels corresponding to each of the plurality of expected features that do not appear in the image may be determined at 503. The regions may be determined by the appearance engine 220 of the augmented reality engine 170. In some implementations, each region may be a 3×3 region of pixels that is located in the image proximate to where an expected feature was expected to have been located in the image. Other sized pixel regions may be used.

Regions of pixels corresponding to each of the plurality of expected features that do appear in the image may be determined at 505. The regions may be determined by the appearance engine 220 of the augmented reality engine 170.

The determined regions of pixels are used to train a color model at 507. The determined regions of pixels may be used to train the color model 225 by the appearance engine 220. The regions of pixels corresponding to the plurality of expected features that do appear in the image may be used to train the color model 225 to determine pixels that are associated with background portions of the image. Similarly, the regions of pixels corresponding to the plurality of expected features that do not appear in the image may be used to train the color model 225 to determine pixels that are associated with foreground regions of the image.

The pixels of the image are partitioned into one or more foreground regions and one or more background regions at 509. Each pixel in the image may be partitioned by the segmentation engine 230 using the color model. In some implementations, the segmentation engine 230 may partition each pixel by determining a probability that the pixel is in a foreground region using the color model 225. Pixels having a probability that is greater than a threshold probability may be partitioned into a foreground region, and pixels having a probability that is lower than the threshold probability may be partitioned into a background region. The determined probabilities may further be used to train the color model 225 for use in a subsequent digital image.

Figure 6:
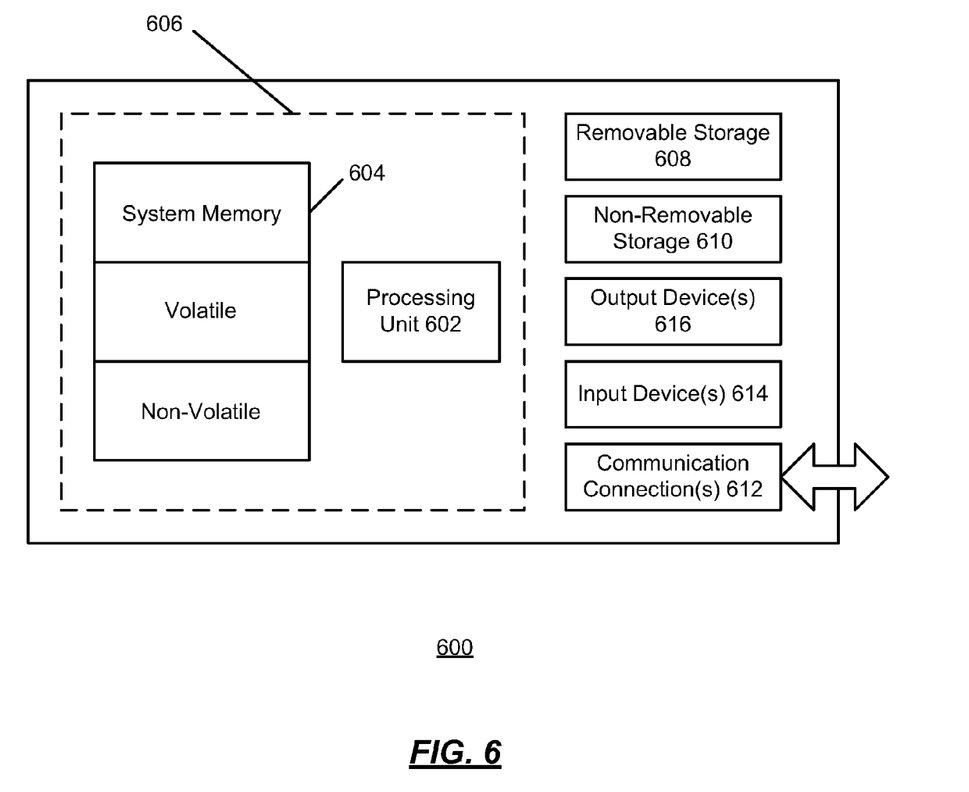
FIG. 6 shows an exemplary computing environment in which example embodiments and aspects may be implemented.

FIG. 6 shows an exemplary computing environment in which example embodiments and aspects may be implemented. An exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by computing device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving an image comprising a plurality of pixels at a computing device, wherein the image is associated with location information;
    determining a plurality of expected features using the location information at the computing device;
    partitioning the pixels of the image into one or more foreground regions and one or more background regions based on the plurality of expected features at the computing device; and
    rendering one or more virtual objects in the image based on the one or more foreground regions and one or more background regions at the computing device.

2. The method of claim 1, wherein the image is received from a digital camera associated with the computing device.

3. The method of claim 1, wherein the location information comprises global positioning system (GPS) coordinates.

4. The method of claim 1, wherein the location information comprises one or more of depth information or orientation information.

5. The method of claim 1, wherein partitioning the pixels of the image into one or more background regions and one or more foreground regions based on the plurality of expected features comprises:
    determining one or more of the plurality of expected features that do not appear in the image;
    determining regions of pixels in the image from the plurality of pixels corresponding to each of the determined one or more of the plurality of expected features that do not appear in the image;
    training a color model using the determined regions of pixels in the image corresponding to each of the determined one or more of the plurality of expected features that do not appear in the image; and
    partitioning the plurality of pixels into the one or more foreground regions using the color model.

6. The method of claim 5, wherein the color model is a Gaussian mixture model.

7. The method of claim 5, wherein partitioning the pixels of the image into one or more background regions and one or more foreground regions based on the plurality of expected features comprises:
    determining one or more of the plurality of expected features that appear in the image;
    determining regions of pixels of the plurality of pixels corresponding to each of the determined one or more of the plurality of expected features that appear in the image;
    training the color model using the determined regions of pixels corresponding to each of the determined one of more of the plurality of expected features that appear in the image; and
    partitioning the plurality of pixels into the one or more background regions using the color model.

8. The method of claim 5, wherein partitioning the plurality of pixels into the one or more foreground regions using the color model comprises computing a probability for each pixel that the pixel is in one or more foreground regions using the color model, and partitioning each pixel into the one or more foreground regions that has a probability that is greater than a threshold probability.

9. The method of claim 8, further comprising computing the probability for each pixel using the color model and a computed probability for one or more pixels that are neighbors of each pixel.

10. The method of claim 1, wherein the computing device comprises a mobile phone.

11. A method comprising:
    generating an image comprising a plurality of pixels at a computing device, wherein the image is associated with location information;
    providing the location information by the computing device;
    receiving a plurality of expected features based on the location information at the computing device;
    determining one or more of the plurality of expected features that are not found in the generated image by the computing device;
    partitioning the plurality of pixels into one or more foreground regions and one or more background regions based on the determined one or more expected features by the computing device; and
    rendering one or more virtual objects in a digital image based on the one or more foreground regions and the one or more background regions by the computing device.

12. The method of claim 11, wherein the location information comprises global positioning system (GPS) coordinates.

13. The method of claim 11, wherein partitioning the pixels of the image comprises:
    determining regions of pixels of the plurality of pixels corresponding to each of the determined one or more features;
    training a color model using the determined regions of pixels; and
    partitioning the pixels into the one or more foreground regions using the color model.

14. The method of claim 13, wherein the color model is a Gaussian mixture model.

15. The method of claim 13, wherein partitioning the pixels into the one or more foreground regions using the color model comprises computing a probability for each pixel that the pixel is in one or more foreground regions using the color model, and partitioning each pixel into the one or more foreground regions that has a probability that is greater than a threshold probability.

16. The method of claim 15, further comprising computing the probability for each pixel using the color model and a computed probability for one or more pixels that are neighbors of each pixel.

17. The method of claim 11, wherein the computing device is a mobile phone.

18. A system comprising:
a location determiner adapted to determine location information for a digital image, wherein the digital image comprises one or more pixels; and
an augmented reality engine adapted to:
determine a plurality of expected features based on the location information;
determine one or more of the plurality of expected features that are not found in the digital image;
partition the pixels of the image into one or more foreground regions and one or more background regions based on the determined one or more features; and
render one or more virtual objects in the digital image based on the one or more foreground regions and the one or more background regions.

19. The system of claim 18, wherein the augmented reality engine is further adapted to:
determine regions of pixels of the plurality of pixels corresponding to each of the determined one or more features;
train a color model using the determined regions of pixels; and
partition the pixels into the one or more foreground regions using the color model.

20. The system of claim 19, wherein the color model is a Gaussian mixture model.

* * * * *